F. J. NORTON.
DEFLECTOR.
APPLICATION FILED JULY 21, 1915.
1,166,244.
Patented Dec. 28, 1915.
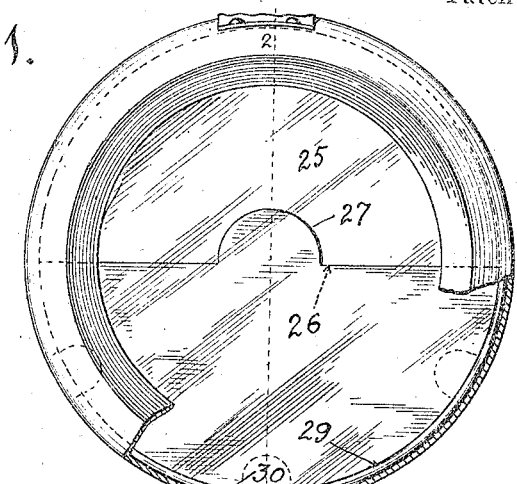
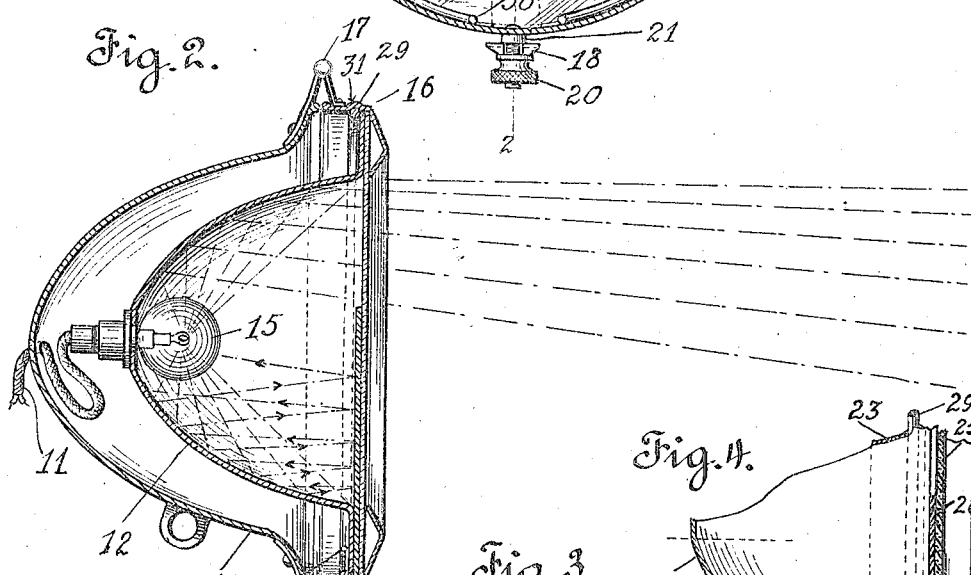
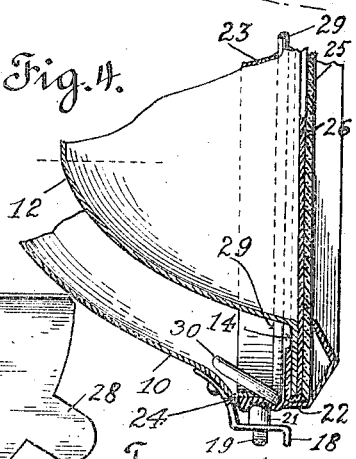
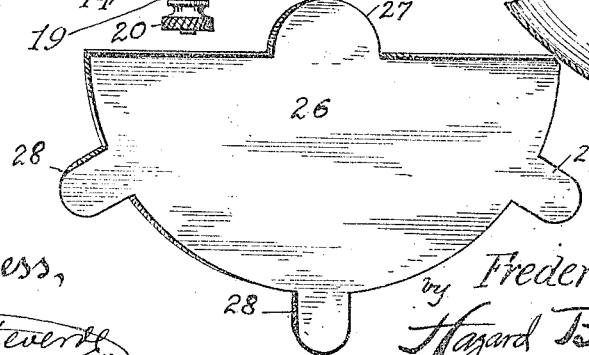
Witness,
H. Monteverde.
Inventor,
Frederic J. Norton
by Hazard Berry & Miller
Attorneys.

UNITED STATES PATENT OFFICE.

FREDERIC J. NORTON, OF BAIRDSTOWN, CALIFORNIA.

DEFLECTOR.

1,166,244.  Specification of Letters Patent.  Patented Dec. 28, 1915.

Application filed July 21, 1915. Serial No. 41,095.

*To all whom it may concern:*

Be it known that I, FREDERIC J. NORTON, a citizen of Great Britain, residing at Bairdstown, in the county of Los Angeles and State of California, have invented new and useful Improvements in Deflectors, of which the following is a specification.

My invention relates to a deflector for head lights of vehicles, especially motor vehicles, which is adapted to concentrate the light upon the road without impairing the brightness or efficiency of the head light, yet at the same time eliminating all the objectionable glare due to the upper and the side rays of the head light.

As well known the legal requirements of practically all municipalities call for two lighted lamps in front of the vehicle showing white lights visible under normal atmospheric conditions at least five hundred feet in the direction in which the motor vehicle is proceeding. Many head lights far exceed the requirements as to distance, and the resulting glare of the upper and the side rays of the head lights is greatly objectionable not only because of the danger to pedestrians, who when coming within the stream of light are momentarily blinded by the intensity thereof, but also on account of the danger of collision between motor vehicles going in opposite directions when the drivers thereof are struck by the light of the vehicle going in the opposite direction. In order to minimize the danger from the source just stated, municipalities are passing ordinances requiring that the front lights of the motor vehicles shall be so directed that the center rays thereof shall strike the ground within a distance of seventy-five feet from the front of the motor vehicle, or shall be so dimmed as to eliminate all glare therefrom.

It is an object of this invention to provide a device simple in construction, positive in operation and easily applied to any of the head lights now in use, which will concentrate without loss the objectionable upper and side rays of the light so as to comply with the above, or similar municipal ordinances.

Another object of this invention is to provide a deflector which is practically invisible and that will not in the least detract from the normal appearance of the head light.

With these and other objects in view my invention consists in the construction and arrangement of parts hereinafter described and claimed.

In the accompanying drawings which form a part of this specification I have illustrated a preferred embodiment of my invention, and in which—

Figure 1, is a front elevation of a head light with parts broken away, equipped with my improved deflector. Fig. 2, is a vertical cross section taken on line 2—2 Fig. 1. Fig. 3, is a deflector removed from the head light. Fig. 4, is a detail view showing the mounting of the deflector in the head light.

The head light may be of any preferred construction.

10 designates the outer housing thereof through which an electric connection 11 leads to the apex of the parabolic reflector 12 suitably spaced from the outer housing 10 by means of a circular flange 14. An electric light 15 is mounted on the interior wall of said reflector near the focus thereof.

A door 16 consisting of a circular metal frame is hinged at 17 at the top of the outer edge of the flaring end of the outer housing 10.

At a point on the outer edge of the housing 10, diametrically opposed to hinge 17, is a slotted ear 18 provided with upturned edges, which projects in horizontal and spaced relation from the lower edge of said housing. A screw 19 rigidly mounted on the outer side of door frame 16 extends between the slot of the ear 18 when the door is closed. A thumb screw 20 rotatably mounted on screw 19 serves to engage slotted ear 18 pressing the same against a cylindrical boss 21 encircling the screw 19, thus securely maintaining the door in its locked position. The door frame is provided with a circular flange 22 extending horizontally whose outer edge is adapted to engage and lie flat against a horizontal flange 23 provided at the outer edge of housing 10. The end of the flange 22 of the door frame abuts against a rib 24 at the inner end of flange 23. A circular glass plate or lens 25 is vertically mounted in the door frame and my improved deflector 26 lies flat and parallel against the inner lower half of glass 25.

The deflector consists of a thin sheet of metal, such as brass or copper, and is provided with a coat or layer of polished silver on both sides. The shape of the deflector is semi-circular and of a size to cover the lower half of the head light. A small semi-circular lug or ear 27 projects upwardly from the middle of the upper edge and serves to screen the electric light 15. The curved edge of the deflector is provided with a number of projecting ears 28, which are three in number in the deflector shown, although it is obvious that the number is immaterial. The deflector is held in place against the lens 25 by the flange 14 of the reflector. The ears 28 are bent over the outer edge of the flange 14, and extend upwardly against the inner side thereof. The function of the ears 28 is to clamp the deflector securely in place preventing any lateral displacement thereof. The lens 25, deflector 26 and the reflector 12 are securely clamped in place against the door frame by the usual means, such as a circular loop 29 made of heavy steel wire, which is provided with two inwardly extending ends 30. This loop is adapted to engage an outwardly extending groove 31 of the flange 22 of the door frame.

The reflector throws the rays of light in the shape of a diverging cone outwardly from the head light. This is due to the fact that the reflector, although parabolic in shape, does not receive all the light from a single point at the focus. The source of light in the reflector is necessarily of an appreciable size, and it is only those rays which emanate from the true focus that are thrown outwardly parallel with the longitudinal axis of the parabolic reflector. The rays of light coming from a point outside the focus and from the side nearer the lens will be reflected, as shown in Fig. 2, that is the rays of light striking the upper half of the reflector will be reflected slightly downwardly, while the rays striking the lower half of the reflector will be reflected slightly upwardly. It is these rays that cause the cone shaped stream of light above referred to. It is the object of this invention to cut off these secondary rays of light, which come from the lower half of the reflector, and which are most objectionable in the glare of the head light. Deflector 26 throws the rays falling upon it from the lower half of the reflector to the upper half thereof, whence the light rays will be reflected in a forward and slightly downward direction.

In place of a deflector plate the lower half of the face of the head light glass may be coated with a layer of polished metal, such as silver or similar metal.

It is thus seen that I have provided an extremely simple device easily applied to any head light, which will concentrate the light without loss on the road in front of the motor vehicle, and which will effectively eliminate all the objectionable glare associated with the ordinary head light. At the same time the presence of the deflector is not noticeable and the normal appearance of the head light is preserved.

I claim:

1. A deflector for head lights of motor vehicles adapted to be mounted against the inner lower half of the glass of the head light consisting of a polished thin metal plate semi-circular in shape, and provided with a semi-circular lug extending from the center of the straight edge thereof, said deflector being provided at its curved edge with a plurality of clamping ears.

2. A deflector for head lights of motor vehicles adapted to be mounted against the inner lower half of the glass of the head light consisting of a polished thin metal plate semi-circular in shape, said deflector being provided at its curved edges with clamping means adapted to secure the same to the head light.

In testimony whereof I have signed my name to this specification.

FREDERIC J. NORTON.